Jan. 12, 1937. K. V. NESSELMANN 2,067,678
REFRIGERATION
Filed April 8, 1933 2 Sheets-Sheet 1
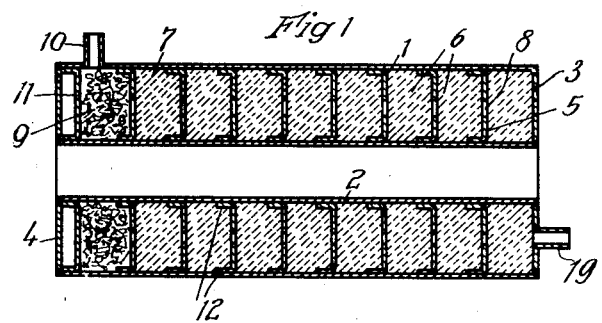
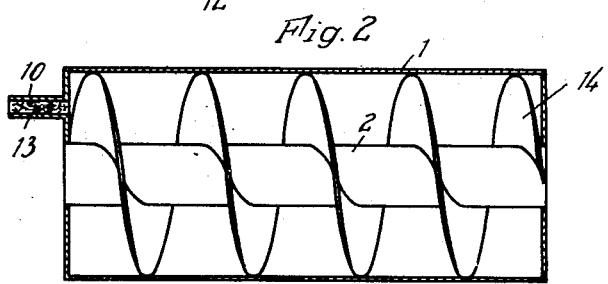
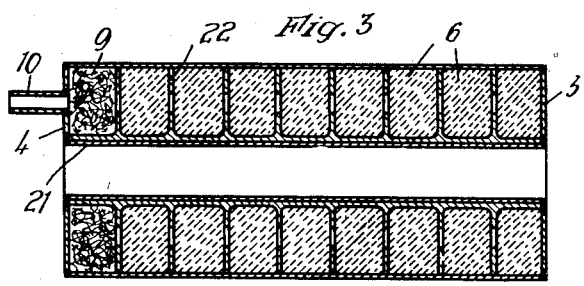
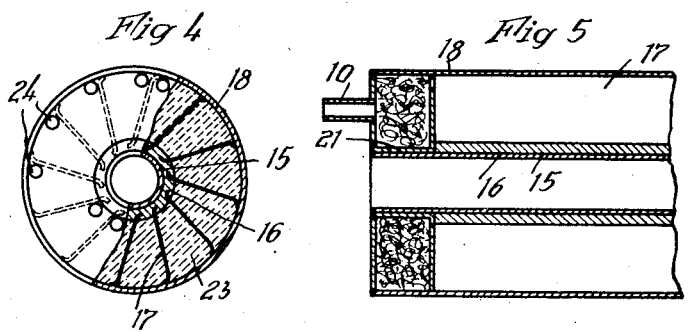
Inventor
Kurt V. Nesselmann
By Robb & Robb
Attorneys

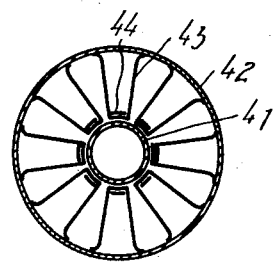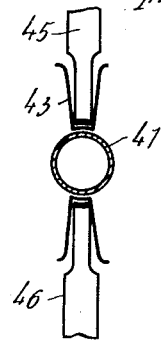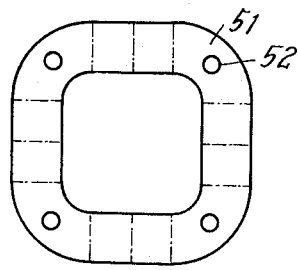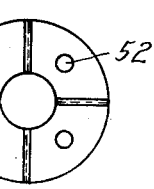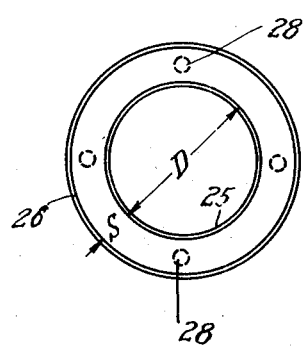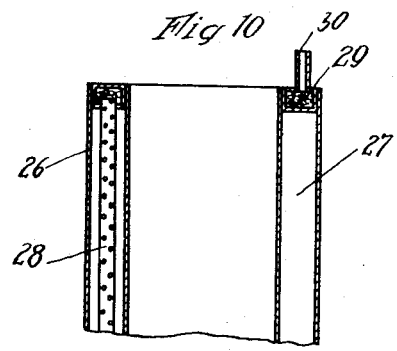

Patented Jan. 12, 1937

2,067,678

UNITED STATES PATENT OFFICE 2,067,678

REFRIGERATION

Kurt V. Nesselmann, Berlin-Siemensstadt, Germany, assignor to Siemens-Schuckertwerke, Aktiengesellschaft, Berlin-Siemensstadt, Germany, a corporation of Germany Application April 8, 1933, Serial No. 665,202
In Germany April 11, 1932

4 Claims. (Cl. 62—118)

My invention relates to a method of producing refrigeration with the aid of an air-cooled absorption apparatus of the intermittent type. Absorption apparatus of the intermittent type operating with chemical absorbents are well-known, in which the heat of absorption is dissipated by the natural current of air to the surrounding atmosphere, and in which the generator-absorber is subjected during the absorption period to the same cooling conditions as during the heating period. Apparatus of this type have the advantage of being very simple in design, which is of the greatest importance, particularly for domestic refrigerators. In this case, no special means of any kind are required which alternately permit decrease of the dissipation of heat during the heating period and increase of the same during the absorption period as is the case in the majority of well-known apparatus of the intermittent type in which flaps are employed in the current of cooled air or valves in the current of a liquid cooling medium.

The object of my invention is to provide a method of producing refrigeration with the aid of an air-cooled absorption apparatus of the intermittent type in which a solid absorbent, particularly calcium chloride is utilized, and ammonia as refrigerant. According to the invention, the refrigerant is driven off from a generator-absorber three times within 24 hours which possesses for each kg. mole of the solid absorbent a cooling surface of at most 200 m² directly in contact with the cooling air, so that during each heating period so much heat is supplied that at least 3.6 moles ammonia is driven off from 1 mole of solid absorbent. Since it is, however, not only necessary to absorb a given amount of working medium in a predetermined time, but also to attain a good utilization of the generator-absorber and to prevent the losses during the heating period from becoming too great, the inner resistance of the generator-absorber due to heat flow is chosen according to the invention smaller than the outer resistance so that the utilization of the operating medium referred to the quantity capable of being theoretically absorbed by the absorbent is as great as possible; however, at least 45 per cent, it being essential that the temperatures of the generator do not assume at any time such a value as to cause changes in the operating or absorbing medium.

The preferred field of application of the invention lies in absorption refrigerating apparatus of the intermittent type used in domestic refrigerators in which calcium chloride as absorbent and ammonia as refrigerant are employed. As compared to the apparatus of this type hitherto known which are relatively poorly utilized, the advantage of my invention lies in the fact that the generator may in general be better utilized and that a three-period operation may be carried out to advantage. This results in considerably smaller dimensions of the generator-absorber as compared to the well-known single-period apparatus. The danger of too high a temperature inside the generator is avoided according to the invention by increasing the heat conductivity in the interior of the solid absorbent with the aid of suitable means known to those skilled in the art.

In this manner it is possible to heat up the parts of the generator-absorber situated farthest from the heating tube to a sufficiently high value without subjecting the absorbing medium lying nearer the heating tube to dangerous temperatures. To this end, a considerably greater number of heat-conducting horizontal or longitudinal walls may, for instance, be arranged in the generator-absorber or the heat conductivity of the solid absorbent may be even correspondingly increased by filling up the generator with good heat-conducting metallic cuttings. Since the inner metallic surface in the generator-absorber may easily give rise to a decomposition of the refrigerant, it is advisable in this case to use for the heat-conducting walls and other metallic inserts such as metallic cuttings a material which does not cause a decomposition of the refrigerant even in the case of a high temperature. For this purpose, the use of copper as material for the heat-conducting walls is particularly suitable. By the selection of a suitable material and arrangement, the outer cooling surfaces of the generator-absorber in apparatus of this type are so designed that they ensure the dissipation of the heat of absorption without increasing the heat losses. In this manner an extremely compact construction of the generator-absorber results.

In apparatus operating with strontium bromide as absorbent, the heat-radiating surfaces of the generator-absorber are preferably so dimensioned that the ratio of the differences in temperature between the heated generator surface and the surface not heated, on the one hand, and the latter surface and the room temperature, on the other hand, is smaller than 0.5 at the end of the heating period.

The resistance of the generator-absorber due to heat flow computated from the inner heating tube to the outside air may be maintained in a generator according to the invention in the same order of magnitude as in the case of the generators hitherto known without artificial control of the cooling medium. This total resistance due to heat flow must be so dimensioned that, on the one hand, a sufficient dissipation of the heat of absorption during the absorption period takes place whereas, on the other hand, the heat losses remain within reasonable limits during the heating period. The distribution of the resistance is, however, effected according to the invention in such a manner that a resistance as small as possible exists in the interior of the generator and the remaining portion of the resistance due to heat flow is distributed over the zone between the outer periphery of the generator and the outside air. To attain a good transfer of heat from the heating tube to the heat-conducting walls and from the latter to the outer walls of the generator absorber the outer jacket of the generator is pressed on the inner heat conducting walls.

Apart from the well-known means for improving the heat conduction in the interior of the generator other special means may be, conveniently, provided so as to improve the transfer of heat from the inner heating tube of the generator-absorber to the absorbent. For this purpose, it is of advantage to bring the heat-conducting walls as far as possible into a proper metallic contact with the heating tube. A way of accomplishing this consists in casting the heat-conducting walls with the heating tube. This may be done in various ways; for instance, by the use of aluminum as heat-conducting material, the ribs may be cast with an aluminum ring which in turn is shrunk on the inner heating tube. The ribs in this case may also be made integral with the aluminum ring. However, it is of particular advantage to make the ribs out of single aluminum sheets, since the latter owing to their resiliency also ensure a good heat conduction with the outer walls of the generator-absorber. By the use of iron ribs as heat-conducting walls, the latter may be directly welded onto the inner heating tube. Still more advantageous is, however, the use of copper ribs in view of the better heat conductivity. The copper ribs may be metallically associated with the inner iron tube of the generator-absorber in a manner hereinafter described. In order to enhance the effect of the heat-conducting walls, the solid absorbent may further be also mixed prior to filling the generator therewith, with metallic cuttings; for instance, aluminum or copper cuttings which ensure a far-reaching distribution of the heat from the heat-conducting walls to the absorbent as a result of the good heat conductivity thereof. Even without the use of heat-conducting walls, it is also possible to attain the desired uniform distribution of temperature in the interior of the generator-absorber by selecting a relatively large diameter of the heating tube of the generator-absorber and placing a relatively thin annular layer of absorbent on said heating tube. In the case of the novel distribution of the inner and outer resistance due to heat flow, the cooling effect of the air flowing along the outer generator jacket may be transferred to the interior of the generator in a uniform manner during the absorption period.

In the accompanying drawings various forms of construction of the generator-absorber are diagrammatically illustrated.

Fig. 1 shows a longitudinal sectional view of a generator with heat-conducting walls;

Fig. 2 shows a longitudinal sectional view of a generator with helically formed walls for the inner heat conduction;

Fig. 3 shows a longitudinal sectional view of a modified form of the generator with walls;

Fig. 4 shows a cross-sectional view of a generator with longitudinal walls;

Fig. 5 shows a longitudinal sectional view thereof;

Fig. 6 shows a cross-section of another modified form of a generator with longitudinal heat-conducting walls which are welded to the inner heating tube;

Fig. 7 illustrates the manner in which the heat-conducting walls of Fig. 6 may be welded to the heating tube;

Figs. 8a to 8c illustrate another modified form of a heat-conducting wall to be arranged in a generator-absorber according to the invention;

Fig. 9 illustrates a plan view of another modified form of the generator shown in longitudinal view in Fig. 10.

Referring to Fig. 1, the generator-absorber consists of a jacket 1 and an inner tube 2 which are welded together with covers 3 and 4 to form a gas-tight container. The inner tube 2 may be provided with a heating element. In the interior of the generator, traverses 5 of good heat-conducting material are arranged which serve to transfer the heat during the generating period as uniform as possible to the entire contents of the generator. These partitions 5 form cells which are filled with a solid absorbent properly dehydrated such as calcium chloride, strontium bromide and similar salts.

The filling of the generator-absorber may be effected in the following manner: Before welding the cover 4 to the jacket 1 a layer of filling material consisting, for instance, of an absorbent which is finely distributed over metallic cuttings, copper wool or another good heat conductor to improve the heat conduction is charged into the generator-absorber. The filling material is prepared by dipping the copper cuttings or similar substances into a liquefied absorbent or by spraying the liquefied absorbent onto the metallic wool. In both cases the metallic wool is provided with a thin vitreous coating of the absorbent which after being charged into the generator-absorber swells to such an extent upon saturating it with the refrigerant that it fills up the entire volume of the generator.

One of the plate-like ribs 5 is then placed on this first layer of metallic wool coated with the absorbent, whereupon a further layer of filling material and so on is charged until the last rib 5 is brought into position. A layer of metallic wool 9 is placed on the last rib, the wool serving to prevent the absorbent from reaching the outlet opening 10 for supplying and discharging the operating medium.

In order to prevent the water vapor developing from the welding flame from being absorbed by the absorbent during the welding operation, the last cell 9 is provided with an air-tight sheet iron cover 11, and the cover 4 is then welded to the jacket 1 as shown in Fig. 1. In the heat-conducting horizontal walls 5 openings 8 are arranged through which the refrigerant gas is supplied and discharged. The heat-conducting walls are provided with flanges 12 which are firmly pressed between the inner tube 2 and the jacket 1 so that the transfer of heat at these points is very good.

In order to prevent the water taken up by the absorbent during the preparation of the generator from causing a decomposition of the working medium during the operation of the apparatus, it is advisable to add to the absorbent, substances which combine the water chemically. Substances, such as barium oxide, strontium oxide, calcium oxide, are suitable for this purpose. It is advisable, particularly in the last cell 7 of the generator-absorber to mix the absorbing material strongly with oxides, since here the danger of the water absorption is greatest.

To avoid a decomposition of the refrigerant which may, for instance, occur during extraordinary operating conditions; for instance, in case the contact making clock should fail to operate during the heating period, it is advisable to treat the surface of the inner walls of the absorber in such a manner that a decomposition of the refrigerant, for instance, ammonia is prevented.

To this end, the inner metallic parts of the generator-absorber which come into contact with the refrigerant may be treated in such a manner with another substance which forms a chemical compound with the materials of which the generator-absorber is made that a decomposition of the refrigerant is prevented. If the generator is, for instance, made of steel all steel surfaces of the generator-absorber which come into contact with ammonia may be nitrified.

This nitrification may, for instance, be effected subsequent to the charge of the filling material by forcing, upon simultaneous application of heat ammonia gas through both connecting branches 10 and 19 of the generator-absorber. This has at the same time the advantage that the water contained in the absorbing material is easily driven out therefrom, particularly if vacuum is employed, provided that no oxide is mixed with the absorbent for the above purpose. In order to attain a good nitrification, the heating may be both effected from the inside and the outside. The heating temperature is adjusted to such a value that the ammonia when coming into contact with the inner iron surfaces of the generator-absorber will be decomposed and the nitrogen developing thereby passes over to the iron, thus forming nitrite. In this manner a nitrite layer is formed which prevents the decomposition of the ammonia on the metallic inner parts of the generator-absorber, i. e., on the surfaces of the tubes 1 and 2 and the surfaces of the heat-conducting walls provided that they consist of iron. The jacket 1 of the generator-absorber may be provided at its outer surface with a coating of aluminum bronze so as to prevent the radiation of heat.

Fig. 2 shows a form of construction in which a helical sheet iron 14 wound around the inner heating tube 2 serves as heat-conducting wall in the interior of the generator-absorber. Means, such as metallic cuttings are disposed in the connecting pipe 10 in order to prevent the absorption material from penetrating into the tube 10. In the embodiment shown in Fig. 2 a layer 13 of metallic wool is provided for this purpose. The generator space between the ribs is filled up with metallic wool which had previously been dipped into the liquefied absorbent. In this case the heating tube provided with the helical ribs may be also immersed with the metallic wool filling as a whole into the liquid absorbing medium and then placed in the generator-absorber container. A gas channel extending through the entire absorber may be made by winding in the helical generator space a layer of metallic wool not coated with absorbing medium around the heating tube.

Fig. 3 shows another form of the invention in which the heating tube 21 of the generator is provided with cast on aluminum ribs 22 so as to attain in the generator-absorber a distribution of temperature as uniform as possible. As compared to the forms of construction with shrunk on or pressed on ribs the resistance to the passage of heat from the heating tubes to the ribs is in this case considerably reduced. The filling of the generator-absorber may be effected in such a manner that the absorbing medium partially enriched with the operating medium is charged through an opening into the completely prepared generator-absorber already provided with the heat-conducting ribs 22. In order to prevent the absorbing medium from passing into the conduit 19, the space 9 is preferably filled with a protective material, such as metallic wool.

The ribs may also be made of aluminum sheet and cast into an aluminum jacket which is cast on the heating tube or shrunk thereon. Figs. 4 and 5 disclose in this connection as embodiment a horizontal and longitudinal sectional view of a generator-absorber. 15 denotes the inner tube, 16 the outer jacket of the generator-absorber. 16 is an aluminum jacket surrounding the inner tube into which jacket the aluminum sheets 17 are cast as shown in Fig. 4. At the side where the gas outlet opening 19 is arranged a cover 21 is placed on the inner tube 15. This cover has openings 24 for the passage of the refrigerant. These openings are arranged in such a manner that an outlet opening is provided for each of the longitudinal cells 23 at the highest point of each cell. In this manner it is possible to prevent the mass in an unswollen state from being distributed non-uniformly over the cells.

Figs. 6 and 7 show another method of attaining a good transfer of heat from the inner tube to the heat-conducting walls which consists in welding or soldering the single sheet strips to the heating tube. 41 denotes the inner heating tube and 42 the outer jacket of the generator-absorber. 43 are heat-conducting walls of the U-shape consisting of copper. These walls are secured metallically to the inner heating tube 41 by placing on the iron tube 41 the double rib 43 as disclosed in Fig. 7 and the then small iron strip 44. When welding by means of electricity the copper melts and solders the iron strip to the heating tube. In this manner it is possible to obtain an absolutely firm connection between the iron heating tube and the heat-conducting copper walls without there being any necessity of using welding powder and the like. The ribs 43 are provided at the upper end with a bent edge and are resilient, so that they may be properly pressed on the outer metal tube 42. In Fig. 7 is shown how the two diametrically opposed ribs may be simultaneously soldered by means of the electrodes 45 and 46.

Instead of single double ribs, it is also possible to solder the well-known undulated metallic sheet both to the heating tube and to the outer jacket. The placing of the iron strips 44 at the lower end of the double rib may be also avoided if electrodes of hard metal containing, for instance, tungsten are employed for the soldering process.

Figs. 8a to 8c finally show a construction for heat conducting ribs which are characterized by the fact that the parts serving for the heat conduction extend in the horizontal direction of the generator-absorber as well as in the longitudinal direction.

In this manner a heat conducting body results such as illustrated in plan and sectional view in Figs. 8b and 8c made from a stamped out sheet iron 51 as shown in Fig. 8a by folding the latter at the points as shown by the dotted lines. By placing a large number of such individual bodies one upon the other, the entire generator is provided in the usual manner with heat conductors. In order to effect a passage of the gas, openings 52 are arranged in the ribs.

Another embodiment of my invention is illustrated in horizontal and longitudinal sectional view in Figs. 9 and 10. In this case, the good heat conduction through the generator-absorber is not attained by the arrangement of heat-conducting walls but by the use of a heating tube having a large diameter D and a comparatively thin annular layer S for the absorbent. The heating tube 25 and the outer tube 26 enclose the generator space 27 charged with the filling material. In order to ensure a supply and discharge of the vaporous refrigerant four perforated tubes 28 are arranged which extend to the upper part 29 of the generator-absorber filled with metallic wool, to which part 29 the gas conduit 30 is connected. These conduits may also be filled with metallic cuttings in order to prevent the absorbing medium from escaping from the generator.

Gas conduits of the type as disclosed in Figs. 9 and 10 may be employed for all types of generators; and even in the case of longitudinal ribs it is possible to obtain gas channels by filling one or more longitudinal cells with metallic wool free of absorbing medium.

I claim as my invention:—

1. A generator-absorber for air-cooled absorption apparatus of the intermittent type operating with solid absorbents which form a chemical compound with the refrigerant, the absorber being so arranged that it is subjected to the same cooling conditions during the heating period as during the absorption period, and comprising a container, a heating tube extending centrally through said container, the outer walls of said container being exposed to the cooling air during both working periods, an aluminum jacket arranged in heat exchange relation with said tube, and heat-conducting sheets of aluminum embedded in the solid absorbent and firmly secured to the said jacket.

2. A generator-absorber for air-cooled absorption apparatus of the intermittent type operating with solid absorbents which form a chemical compound with the refrigerant, the absorber being so arranged that it is subjected to the same cooling conditions during the heating period as during the absorption period, and comprising a container, a heating tube extending centrally through said container, the outer walls of said container being exposed to the cooling air during both working periods, an aluminum jacket arranged in heat exchange relation with said tube, and heat-conducting sheets of aluminum embedded in the solid absorbent and firmly secured to the said jacket, said sheets of aluminum being bent at their outer edge and arranged in heat contact with the outer walls.

3. A generator-absorber for air-cooled absorption apparatus of the intermittent type operating with solid absorbents which form a chemical compound with the refrigerant, comprising an inner heating tube for supplying the generating heat, heat-conducting longitudinal walls embedded in the absorbing material, said walls being arranged between the inner heating tube and the outer jacket of the generator-absorber and subdividing the interior of the generator into longitudinal cells, a cover-plate for said cells having openings therein opposite the gas outlet opening of the generator-absorber, said openings being arranged in such a manner that they are disposed at the highest point of each individual cell, said tube and walls being so dimensioned that the temperature of the generator at no point assumes such a value as to cause changes in the operating or absorbing medium.

4. A generator-absorber for absorption apparatus of the intermittent type operating with solid absorbents, comprising an outer jacket, an inner heating tube and lateral covers, heat-conducting longitudinal walls embedded in the absorbent, said walls being arranged between the inner heating tube and the outer jacket and dividing the interior of the generator-absorber into longitudinal chambers, said walls being fixedly secured to said heating tube to form therewith a heat-conducting body and so designed as to be elastically secured to the inner surface of the outer jacket after said heat-conducting body has been introduced into said jacket.

KURT V. NESSELMANN.